United States Patent [19]

Fukuda

[11] Patent Number: 5,022,508
[45] Date of Patent: Jun. 11, 1991

[54] CLUTCH COVER ASSEMBLY

[75] Inventor: Yoshinobu Fukuda, Neyagawa, Japan

[73] Assignee: Kubushiki Kaisha Daikin Seisakusho, Osaka, Japan

[21] Appl. No.: 469,468

[22] PCT Filed: Jul. 14, 1989

[86] PCT No.: PCT/JP89/00713

§ 371 Date: Mar. 29, 1990

§ 102(e) Date: Mar. 29, 1990

[87] PCT Pub. No.: WO90/01642

PCT Pub. Date: Feb. 22, 1990

[30] Foreign Application Priority Data

Aug. 12, 1988 [JP] Japan .................. 63-107050[U]

[51] Int. Cl.⁵ .................................. F16D 13/50
[52] U.S. Cl. ................... 192/70.27; 192/89 B
[58] Field of Search ............ 192/70.27, 70.28, 89 B, 192/109 A

[56] References Cited

U.S. PATENT DOCUMENTS

| | | | |
|---|---|---|---|
| 2,641,344 | 6/1953 | Banker | 192/70.27 |
| 3,300,007 | 1/1967 | Hotsch | 192/89 B |
| 4,095,683 | 6/1978 | Ban | 192/109 A |
| 4,602,708 | 7/1986 | Nagano | 192/70.27 |
| 4,949,829 | 8/1990 | Tojima et al. | 192/89 B |

FOREIGN PATENT DOCUMENTS

| | | | |
|---|---|---|---|
| 4515366 | 6/1970 | Japan . | |
| 4517446 | 6/1970 | Japan . | |
| 106129 | 5/1987 | Japan | 192/89 B |
| 943039 | 11/1963 | United Kingdom | 192/89 B |
| 1050553 | 12/1966 | United Kingdom | 192/89 B |

Primary Examiner—Allan D. Herrmann
Assistant Examiner—Andrea Pitts
Attorney, Agent, or Firm—Armstrong, Nikaido, Marmelstein, Kubovcik & Murray

[57] ABSTRACT

A clutch cover assembly for enabling an improvement in durability and an elongation of service life of facings (5) by maintaining cushioning function in axial direction and giving a sufficient thickness to the facings. In order to accomplish the above object, a driven plate (3) onto which the facings (5) are secured is formed into a flat-shape, a diaphragm spring (15) is made contact with a pressure plate (11) in such a manner as separable therefrom in axial direction, a cushioning conned disc spring (20) is compressively installed between the diaphragm spring (15) and the pressure plate (11), and the conned disc spring (20) exerts a pressing force on the pressure plate (11) during a prescribed cushioning movement of the diaphragm spring (15) from when it begins to leave the pressure plate (11) at time of releasing operation.

1 Claim, 2 Drawing Sheets

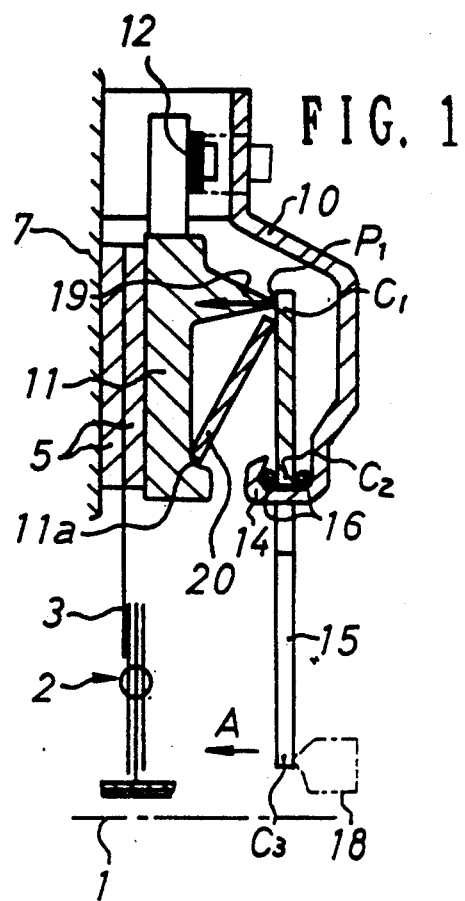
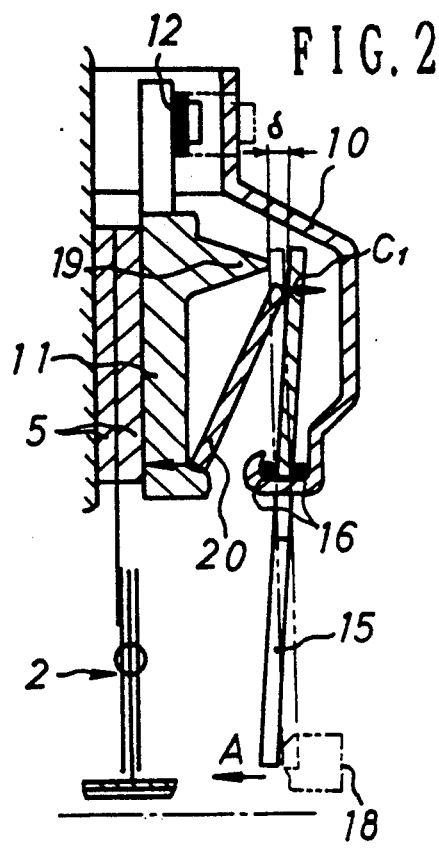
FIG. 2
FIG. 1
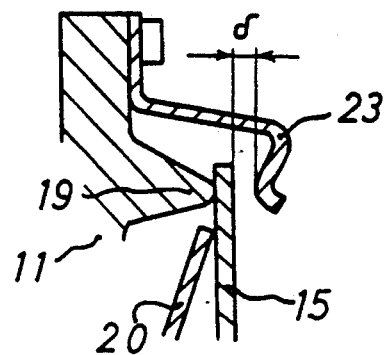
FIG. 3

CLUTCH COVER ASSEMBLY

DESCRIPTION

1. Technical Field

This invention relates to a clutch cover assembly.

2. Background Art

Conventionally, a corrugated or stepped cushioning plate 25 compressible in axial direction has been installed between a flywheel 7 and pressure plate 11, and facings 5 have been provided on opposite sides of the cushioning plate 25 so as to accomplish a cushioning function in a driven plate for clutch disc, as illustrated in FIG. 5.

In case of utilizing such cushioning plate 25, it has not been possible to provide sufficient width to the cushioning plate 25 between flywheel 7 and pressure plate 11 to improve durability and extend service life of the facing, because of axial width or thickness of the cushioning plate 25 itself.

OBJECT OF THE INVENTION

An object of this invention is to accomplish an elongation of service life of the facing by making it possible to perform a cushioning function between a pressure plate and a diaphragm spring.

DISCLOSURE OF THE INVENTION

Technical Measure

In order to accomplish the above object in this invention, a pressure plate is connected to a clutch cover through a strap plate, a driven plate to which facings of a clutch disc are secured is made into a flat-shape, a diaphragm spring, exerting a pressing load on the pressure plate, is supported by a clutch cover and made contact with the pressure plate in such a manner as separable therefrom in axial direction, a cushioning coned disc spring is installed compressively between the diaphragm spring and the pressure plate, a load of the coned disc spring is set smaller than a diaphragm spring load at time of clutch engagement and larger than a reaction force of the strap plate, thereby the coned disc spring is adapted to exert a pressing load on the pressure plate during a prescribe cushioning movement of the diaphragm spring from when it begins to leave the pressure plate at the time of clutch releasing operation.

Function

The diaphragm spring first leaves the pressure plate at the time of clutch releasing operation. However, the pressing load is exerted on the pressure plate by an elastic force of the coned disc spring compressively installed between the pressure plate and the diaphragm spring. Thereby a so-called semi-engaged condition is maintained during a prescribed stroke.

When a clearance between the diaphragm spring and the pressure plate reaches the prescribed stroke, the pressing load exerted by the coned disc spring disappears so that the pressure plate is separated from the facing by means of the reaction force of the strap plate.

BRIEF DESCRIPTION OF THE DRAWINGS

FIG. 1 is a vertical sectional partial view of a clutch cover assembly according to the invention.

FIG. 2 is a vertical sectional view of the same part as FIG. 1 at time of releasing operation.

FIG. 3 is a vertical sectional partial view showing an embodiment applied to a clutch equipped with a clip.

BEST MODE FOR CARRYING OUT THE INVENTION

Figure 4:
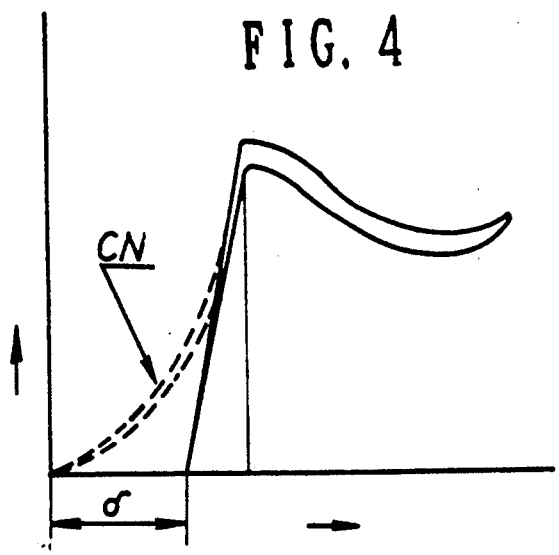
FIG. 4 is a pressing load characteristic diagram.
Figure 5:
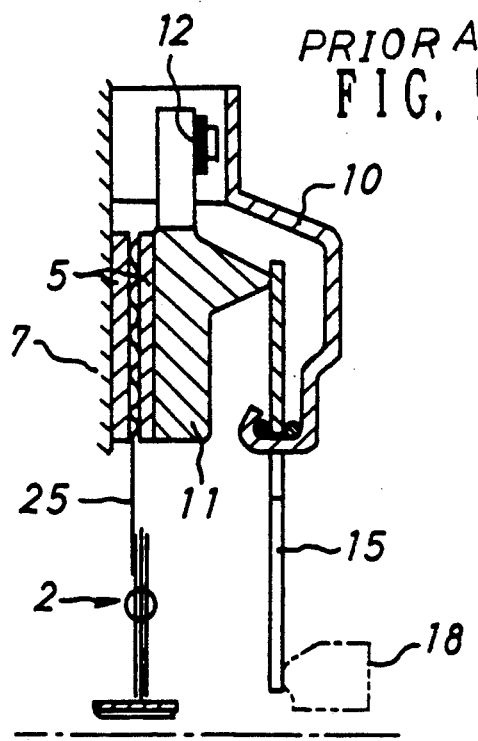
FIG. 5 is a vertical sectional view of conventional embodiment.

In FIG. 1, showing the vertical sectional view of the clutch according to this invention, a clutch disc 2 is spline fits onto an output shaft 1 at its inner peripheral spline hub. A flat-shaped driven plate 3 is secured to an outer peripheral end of the clutch disc 2, and facings, 5, are secured to opposite surfaces of the driven plate 3. The facings 5 are molded integrally by way of through holes on the driven plate 3 and are disposed between an engine side flywheel 7 and a pressure plate 11.

A clutch cover 10 is fastened to an end face of the flywheel 7. The pressure plate 11 is connected to the clutch cover 10 and axially movably in relation thereto by resilient strap plates 12 disposed at plural places with spaces left therebetween in circumferential direction. A tab 14 is formed on the clutch cover 10 at its end opposite to the flywheel side, and an annular intermediate fulcrum point C2 of a diaphragm spring 15 is held by a pair of wire rings 16 supported by the tab 14. An outer peripheral end C1 of the diaphragm spring 15 is made to contact with a fulcrum land 19 of the pressure plate 11, and an inner peripheral end C3 is made to contact with a release bearing 18 so as to exert a pressing force P1 on the pressure plate 11.

A cushioning coned disc spring 20 which is an essential part of this invention is compressively installed between the diaphragm spring 15 and the pressure plate 11. The coned disc spring 20 mates with a stepped part 11a of the pressure plate 11 at its radial inner peripheral edge, and mates with a portion near to the outer peripheral end C1 of the diaphragm spring 15 at its outer peripheral edge.

A spring load of the coned disc spring 20 is so set that it is smaller than a spring load of the diaphragm spring 15 and larger than a reaction force of the strap plate when the coned disc spring is loaded (at time of clutch engagement). Further, the coned disc spring 20 is so constructed as to become approximately free when the diaphragm spring 15 leaves the fulcrum land 19 and a clearance therebetween reaches a prescribed maximum cushioning distance (stroke distance) δ. Namely, the maximum cushioning distance δ is set by a free height of the coned disc spring 20.

Function will be described hereunder. Because the load of the diaphragm spring 15 is larger than that of the coned disc spring 20 when it is loaded (at the time of clutch engagement) as illustrated by FIG. 1, the outer peripheral end of the diaphragm spring 15 presses on the fulcrum land 19 to exert, pressing force P1 on the pressure plate 11.

A solid line of FIG. 2 shows a state immediately before the clutch being disengaged from the semi-engaged condition. Namely, when the release bearing 18 is shifted in a direction of arrow A, the diaphragm spring 15 is deformed from a setting state of imaginary line to the state of solid line around the intermediate fulcrum point C2 at the time of releasing operation. In this instance, the outer peripheral end C1 of the diaphragm spring 15 leaves the fulcrum land 19, and coned disc spring 20 exerts the pressing load on the pressure plate 11 around its inner peripheral edge and outer peripheral edge when the clearance between the fulcrum land 19 and the diaphragm spring 15 lies within the distance. That is, when the outer peripheral end C1 of the diaphragm spring 15 moves within a range of the coned disc spring 20 perform its cushioning function to maintain the semi-engaged condition.

When the clearance between the fulcrum land 19 and the diaphragm spring 15 reaches the distance δ, the coned disc spring 20 becomes free and the pressing force on the pressure plate 11 becomes zero. The pressure plate 11 leaves the facing 5 due to the reaction force of the strap plate 12 when the releasing operation is further continued, and the clutch is disengaged completely under fully released condition. Because the reaction force of the strap plate 12 is smaller than the load of the coned disc spring 20 in this instance, the clearance between the fulcrum land 19 and the outer peripheral end of the diaphragm spring 15 is kept at δ.

In FIG. 4, an axis of abscissa represents a deflection of the diaphragm spring and an axis of ordinate represents a pressing load. When the coned disc spring 20 as illustrated by FIG. 1 is additionally installed, a cushioning characteristic, as shown by broken line, will be added to the diaphragm spring characteristic, as shown by solid line.

ANOTHER MODE FOR CARRYING OUT THE INVENTION

FIG. 3 is an embodiment applied to a clutch wherein a clip 23, for holding the diaphragm spring is provided to the pressure plate 11. The cushioning distance δ is prescribed by a clearance between the set clip 23 and the diaphragm spring 15. The cushioning distance δ can be set to an arbitrary value without being limited by a free height of the coned disc spring 20.

EFFECT OF THE INVENTION

According to this invention as describe above, the following advantages become obtainable:

(1) The cushioning coned disc spring 20 is disposed between the pressure plate 11 and the diaphragm spring 15 so as to obtain the cushioning effect at the time of axial movement of the pressure plate 11. Therefore, the flat-shaped driven plate 3 can be utilized in place of conventional complicated cushioning plates such as of corrugated type etc., so that the limitation on thickness of the facing 5 can be moderated, and the improvement indurability and elongation of service life of the facing 5 can be accomplished.

Especially, the used of the flat-shaped driven plate 3 in place of the foregoing cushioning plate enables the integral molding of the both side facings 5 by way of the through hole of the driven plate 3, thus rivets for fastening the facings become unnecessary and manufacturing cost can be minimized.

(2) Because the pressing force is exerted by the coned disc spring 20 having a load weaker than that of the diaphragm spring 15 under the semi-engaged condition, this structure is also preferable for a countermeasure against clutch judder.

(3) Because the required additional work is only to compressively install the coned disc spring 20 between the pressure plate 11 and the diaphragm spring 15, the installation work is also simple.

Industrial Applicability

The clutch cover assembly of this invention is suitable to automobile clutches and especially most suited to clutches for use in taxi in etc. which clutches are operated frequently.

What is claimed is:

1. A clutch cover assembly having a pressure plate connected to a clutch cover through a resilient strap plate, a flat-shape driven plate to which clutch disc facings are secured, a diaphragm spring for exerting a pressing load on said pressure plate supported by said clutch cover and contacting said pressure plate in such a manner that said diaphragm spring is separated therefrom in an axial direction, a cushion loaded coned disc spring compressively installed between said diaphragm spring and said pressure plate, the cushion loading of said coned disc spring being set smaller than said pressing load of said diaphragm spring at the time of clutch engagement and larger than a reaction force of said resilient strap plate, thereby said coned disc spring exerts a pressing load between said pressure plate and said diaphragm spring as said clutch is disengaged to disengage said diaphragm spring from said pressure plate at the time of clutch releasing operation, the reaction force of said resilient strap plate moving said pressure plate away from said drive plate.

* * * * *